United States Patent
Hama et al.

(10) Patent No.: US 9,300,011 B2
(45) Date of Patent: Mar. 29, 2016

(54) SOLID STATE ELECTROLYTE LAYER, ELECTRODE ACTIVE MATERIAL LAYER, ALL SOLID STATE LITHIUM BATTERY, MANUFACTURING METHOD FOR SOLID STATE ELECTROLYTE LAYER, AND MANUFACTURING METHOD FOR ELECTRODE ACTIVE MATERIAL LAYER

(75) Inventors: Shigenori Hama, Susono (JP); Koji Kawamoto, Miyoshi (JP); Satoshi Wakasugi, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 777 days.

(21) Appl. No.: 12/891,242

(22) Filed: Sep. 27, 2010

(65) Prior Publication Data
US 2011/0076570 A1 Mar. 31, 2011

(30) Foreign Application Priority Data

Sep. 29, 2009 (JP) .................. 2009-225231

(51) Int. Cl.
| | |
|---|---|
| H01M 6/14 | (2006.01) |
| H01M 6/18 | (2006.01) |
| H01M 10/04 | (2006.01) |
| H01M 10/26 | (2006.01) |
| H01M 10/0562 | (2010.01) |
| H01M 10/052 | (2010.01) |
| H01M 10/0565 | (2010.01) |

(52) U.S. Cl.
CPC ........ *H01M 10/0562* (2013.01); *H01M 10/052* (2013.01); *H01M 10/0565* (2013.01); H01M 2300/0068 (2013.01); H01M 2300/0082 (2013.01); H01M 2300/0091 (2013.01); Y02E 60/122 (2013.01); Y02P 70/54 (2015.11)

(58) Field of Classification Search
USPC .................................................. 429/188, 304
See application file for complete search history.

(56) References Cited

U.S. PATENT DOCUMENTS

| | | |
|---|---|---|
| 2009/0081553 A1 | 3/2009 | Kondo et al. |
| 2011/0065007 A1* | 3/2011 | Kamiya et al. ................ 429/322 |

FOREIGN PATENT DOCUMENTS

| | | |
|---|---|---|
| JP | 11-086899 A | 3/1999 |
| JP | 2009-080999 A | 4/2009 |
| JP | 2009-146657 A | 7/2009 |
| JP | 2009-176484 A | 8/2009 |

OTHER PUBLICATIONS

Machine translation of JP 2009-176484, Yanagi et al., Aug. 6, 2009.*
Akitoshi Hayashi et al.: "Preparation of $Li_2S$—$P_2S_5$ Amorphous Solid Electrolytes by Mechanical Milling", J. Am. Ceram. Soc., Feb. 2001, vol. 84, No. 2, pp. 477-479.

(Continued)

*Primary Examiner* — Basia Ridley
*Assistant Examiner* — Caitlin Wilmot
(74) *Attorney, Agent, or Firm* — Sughrue Mion, PLLC (57) ABSTRACT

A solid state electrolyte layer includes a sulfide solid state electrolyte material that is manufactured from a raw material composition containing $Li_2S$ and $P_2S_5$ and is substantially free of bridging sulfur, and a hydrophobic polymer for binding the sulfide solid state electrolyte material.

24 Claims, 3 Drawing Sheets

(56) References Cited

OTHER PUBLICATIONS

Translation of Chinese Office Action for corresponding CN Patent Application No. 201010507148.6 issued on Feb. 5, 2013.

Hiromasa Muramatsu et al.: "Structural analysis of $Li_2S$—$P_2S_5$ solid electrolytes in the atmosphere", the 11th Japanese Chemical Battery Materials Seminar, pp. 69-70, Jun. 9, 2009.

Nobuya Machida et al.: "Preparation of amorphous $75L_2S \cdot xP_2S_3 \cdot (25-x)P_2S_5$ (mol%) solid electrolytes by a high-energy ball-milling process and their application for an all-solid-state lithium battery", Solid State Ionics vol. 176 (2005), pp. 473-479.

Taro Inada et al.: "Silicone as a binder in composite electrolytes", Journal of Power Sources 119-121 (2003), pp. 948-950.

Taro Inada et al.: "Fabrications and properties of composite solid-state electrolytes", Solid State Ionics 158 (2003), pp. 275-280.

Masahiro Tatsumisago et al.: "Preparation of amorphous solid electrolytes in the system $Li_2S$—$SiS_2$—$Li_4SiO_4$ by mechanical milling", Solid State Ionics 136-137 (2000), pp. 483-488.

M. Tatsumisago et al.: "New Lithium ion conducting glass-ceramics prepared from mechanochemical $Li_2S$—$P_2S_5$ glasses", Solid State Ionics 154-155 (2002), pp. 635-640.

Nakagawa et al., "Structural analysis of solid electrolyte for lithium secondary battery", Idemitsu Gihou, vol. 51, No. 2, 2008 pp. 197-206.

Eckert et al., "Structural transformation of non-oxide chalcogenide glasses. The short-range order of lithium sulfide (Li2S)-phosphorous pentasulfide (P2S5) glasses studied by quantitative phosphorous-31, lithium-6, and lithium-7 high-resolution solid-state NMR", Chemistry of Materials, vol. 2, No. 3, 1990, pp. 273-279.

\* cited by examiner

SOLID STATE ELECTROLYTE LAYER, ELECTRODE ACTIVE MATERIAL LAYER, ALL SOLID STATE LITHIUM BATTERY, MANUFACTURING METHOD FOR SOLID STATE ELECTROLYTE LAYER, AND MANUFACTURING METHOD FOR ELECTRODE ACTIVE MATERIAL LAYER

INCORPORATION BY REFERENCE

The disclosure of Japanese Patent Application No. 2009-225231 filed on Sep. 29, 2009, including the specification, drawings and abstract, is incorporated herein by reference in its entirety.

BACKGROUND OF THE INVENTION

1. Field of the Invention

The invention relates to a solid state electrolyte layer and an electrode active material layer in which an increase in resistance due to deterioration of a sulfide solid state electrolyte material is suppressed.

2. Description of the Related Art

With the rapid popularization of information-related devices, communication devices, and so on such as personal computers, video cameras, and portable telephones in recent years, the importance of developing batteries that can be used as power supplies for these devices has grown. Moreover, in the automobile industry and so on, the development of high-output, large-capacity batteries that can be used in electric automobiles or hybrid automobiles is progressing. Among the various types of batteries that currently exist, lithium batteries are the focus of attention due to their high energy density.

An organic electrolyte employing a combustible organic solvent is used in current commercially available lithium batteries, and therefore improvements are required in the manner of attaching safety devices for suppressing temperature increases during short-circuits and structures/material surfaces for preventing short-circuits. In an all solid state lithium battery in which a liquid electrolyte is replaced by a solid state electrolyte to make the battery entirely solid, on the other hand, a combustible organic solvent is not used in the battery, and therefore the safety device can be simplified, leading to a reduction in manufacturing cost and an improvement in productivity.

It is available in the field of all solid state lithium batteries that an improvement in an Li ion conductivity of the all solid state lithium battery can be achieved by employing a sulfide solid state electrolyte material in a solid state electrolyte layer and an electrode active material layer.

Meanwhile, attempts have been made at adding a polymer to the solid state electrolyte layer and the electrode active material layer as a binding material. By adding a polymer, flexibility can be provided in the layer, enabling improvements in workability and moldability. For example, Japanese Patent Application Publication No. 11-086899 (JP-A-11-086899) discloses a solid state electrolyte layer that uses butadiene rubber as a binding material and 0.5 $Li_2S$—0.5 $P_2S_5$ as a sulfide solid state electrolyte material. Further, Taro Inada et al., "Silicone as a binder incomposite electrolytes", Journal of Power Sources 119-121 (2003) 948-950 discloses a solid state electrolyte layer in which styrene-butadiene rubber (SBR), a PO-EO copolymer, or silicone rubber is used as the binding material and $Li_3PO_4$—$Li_2S$—$SiS_2$ is used as the sulfide solid state electrolyte material. Furthermore, Taro Inada et al., "Fabrications and properties of composite solid-state electrolytes", Solid State Ionics 158 (2003) 275-280 discloses a solid state electrolyte layer in which SBR or silicone rubber is used as the binding material and $Li_3PO_4$—$Li_2S$—$SiS_2$ is used as the sulfide solid state electrolyte material.

Among sulfide solid state electrolyte materials, a sulfide solid state electrolyte material that contains bridging sulfur exhibits high Li ion conductivity but is also highly reactive, and therefore a sulfide solid state electrolyte material containing bridging sulfur deteriorates when it reacts with a polymer, leading to an increase in battery resistance.

SUMMARY OF THE INVENTION

The invention provides a solid state electrolyte layer in which an increase in resistance caused by deterioration of a sulfide solid state electrolyte material is suppressed.

A first aspect of the invention relates to a solid state electrolyte layer including: a sulfide solid state electrolyte material that is manufactured from a raw material composition containing $Li_2S$ and $P_2S_5$ and is substantially free of bridging sulfur; and a hydrophobic polymer for binding the sulfide solid state electrolyte material.

Further, a second aspect of the invention relates to an electrode active material layer including: an electrode active material; a sulfide solid state electrolyte material that is manufactured from a raw material composition containing $Li_2S$ and $P_2S_5$ and is substantially free of bridging sulfur; and a hydrophobic polymer for binding the electrode active material and the sulfide solid state electrolyte material.

Further, a third aspect of the invention relates to an all solid state lithium battery including: a positive electrode active material layer; a negative electrode active material layer; and a solid state electrolyte layer formed between the positive electrode active material layer and the negative electrode active material layer. In this all solid state lithium battery, the solid state electrolyte layer includes a sulfide solid state electrolyte material that is manufactured from a raw material composition containing $Li_2S$ and $P_2S_5$ and is substantially free of bridging sulfur, and a hydrophobic polymer for binding the sulfide solid state electrolyte material.

Further, a fourth aspect of the invention relates to an all solid state lithium battery including: a positive electrode active material layer; a negative electrode active material layer; and a solid state electrolyte layer formed between the positive electrode active material layer and the negative electrode active material layer. In this all solid state lithium battery, at least one of the positive electrode active material layer and the negative electrode active material layer includes an electrode active material, a sulfide solid state electrolyte material that is manufactured from a raw material composition containing $Li_2S$ and $P_2S_5$ and is substantially free of bridging sulfur, and a hydrophobic polymer for binding the electrode active material and the sulfide solid state electrolyte material.

Further, a fifth aspect of the invention relates to a manufacturing method for a solid state electrolyte layer, including: mixing a sulfide solid state electrolyte material that is manufactured from a raw material composition containing $Li_2S$ and $P_2S_5$ and is substantially free of bridging sulfur with a hydrophobic polymer in a solvent to prepare a solid state electrolyte layer forming slurry; and coating a substrate with the solid state electrolyte layer forming slurry to form a solid state electrolyte layer forming coated film.

Further, a sixth aspect of the invention relates to a manufacturing method for an electrode active material layer, including: mixing together an electrode active material, a sulfide solid state electrolyte material that is manufactured from a raw material composition containing $Li_2S$ and $P_2S_5$ and is substantially free of bridging sulfur, and a hydrophobic polymer in a solvent to form an electrode active material layer forming slurry; and coating a substrate with the electrode active material layer forming slurry to form an electrode active material layer forming coated film.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A solid state electrolyte layer, an electrode active material layer, an all solid state lithium battery, a manufacturing method for a solid state electrolyte layer, and a manufacturing method for an electrode active material layer according to embodiments of the invention will be described in detail below.

First, a solid state electrolyte layer according to a first embodiment of the invention will be described. The solid state electrolyte layer according to this embodiment includes a sulfide solid state electrolyte material that is manufactured from a raw material composition containing lithium sulfide ($Li_2S$) and diphosphorus pentasulfide ($P_2S_5$) and is substantially free of bridging sulfur, and a hydrophobic polymer for binding the sulfide solid state electrolyte material.

According to this embodiment, by using a sulfide solid state electrolyte material that is substantially free of bridging sulfur and a hydrophobic polymer, a solid state electrolyte layer in which an increase in resistance caused by deterioration of the sulfide solid state electrolyte material is suppressed can be obtained. Bridging sulfur (for example, bridging sulfur of an $S_3P$—S—$PS_3$ unit) is highly reactive and therefore reacts with the polymer, causing the sulfide solid state electrolyte material to deteriorate. However, the sulfide solid state electrolyte material according to this embodiment is substantially free of bridging sulfur and is therefore less likely to deteriorate. As a result, an increase in the resistance of the solid state electrolyte layer can be suppressed. Further, a thio-LISICON material containing germanium (Ge), for example, is used as a conventional sulfide solid state electrolyte material, but similarly to bridging sulfur, the Ge contained in the thio-LISICON material is highly reactive and therefore causes an increase in the resistance of the solid state electrolyte layer. The sulfide solid state electrolyte material according to this embodiment, on the other hand, is a phosphorus-based material that is free of highly reactive sites, in contrast to Ge, and therefore an increase in the resistance of the solid state electrolyte layer can be suppressed.

Meanwhile, in this embodiment, a hydrophobic polymer is used as the polymer serving as a binding material. As will be described below in relation to comparative examples, when the employed polymer contains a hydrophilic group such as a hydroxyl group, an increase in resistance occurs even if a sulfide solid state electrolyte material that is substantially free of bridging sulfur is used. A reason for this is that a sulfur component (a sulfur component other than bridging sulfur) of the sulfide solid state electrolyte material reacts with the hydrophilic group of the polymer. In this embodiment, on the other hand, a hydrophobic polymer not containing a hydrophilic group is used, and therefore a reaction between the sulfur component other than bridging sulfur and the polymer can be suppressed, enabling suppression of an increase in the resistance of the solid state electrolyte layer.

Figure 1:
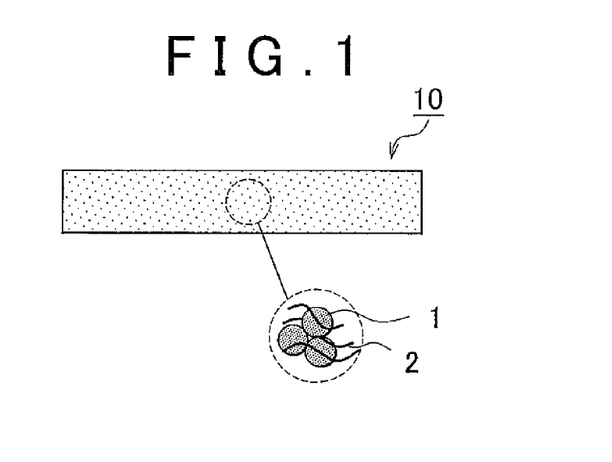
FIG. 1 is a schematic sectional view showing a solid state electrolyte layer according to a first embodiment of the invention.

FIG. 1 is a schematic sectional view showing an example of the solid state electrolyte layer according to this embodiment. A solid state electrolyte layer 10 shown in FIG. 1 contains a sulfide solid state electrolyte material 1 that is manufactured from a raw material composition containing $Li_2S$ and $P_2S_5$ and is substantially free of bridging sulfur, and a hydrophobic polymer 2 for binding the sulfide solid state electrolyte material 1. Each constitution of the solid state electrolyte layer according to this embodiment will be described below.

First, the sulfide solid state electrolyte material according to this embodiment will be described. The sulfide solid state electrolyte material according to this embodiment is manufactured from a raw material composition containing $Li_2S$ and $P_2S_5$ and is substantially free of bridging sulfur. Here, "bridging sulfur" denotes sulfur elements that are generated during manufacture of the sulfide solid state electrolyte material to form bridging bonds (—S— bonds) between sulfides contained in the sulfide solid state electrolyte material. The phrase "the sulfide solid state electrolyte material is substantially free of bridging sulfur" means that the proportion of bridging sulfur contained in the sulfide solid state electrolyte material is small enough to ensure that an interface resistance of the sulfide solid state electrolyte material is not affected by a reaction between bridging sulfur and the hydrophobic polymer. In this embodiment, the proportion of bridging sulfur in the sulfide solid state electrolyte material may be set at no more than 10 mol % but is preferably set at no more than 5 mol %.

Furthermore, the fact that "the sulfide solid state electrolyte material is substantially free of bridging sulfur" can be confirmed by measuring a Raman spectroscopy spectrum of the sulfide solid state electrolyte material. The sulfide solid state electrolyte material according to this embodiment is manufactured from a raw material composition containing $Li_2S$ and $P_2S_5$, and therefore a peak of an $S_3P$—S—$PS_3$ unit (a $P_2S_7$ unit) containing bridging sulfur typically appears at 402 $cm^{-1}$. In this embodiment, this peak is preferably not detected. Further, a peak of a $PS_4$ unit typically appears at 417 $cm^{-1}$. In this embodiment, an intensity $I_{402}$ at 402 $cm^{-1}$ is preferably smaller than an intensity $I_{417}$ at 417 $cm^{-1}$. More specifically, the intensity $I_{402}$ is preferably no more than 70% of the intensity $I_{417}$, more preferably no more than 50%, and even more preferably no more than 35%. The fact that "the sulfide solid state electrolyte material is substantially free of bridging sulfur" may be confirmed using a raw material composition ratio or an NMR measurement result obtained when the sulfide solid state electrolyte material is synthesized, rather than the measurement result of the Raman spectroscopy spectrum.

The sulfide solid state electrolyte material according to this embodiment is manufactured using a raw material composition containing $Li_2S$ and $P_2S_5$. An amorphization method, for example, may be used as a method of manufacturing the sulfide solid state electrolyte material (sulfide glass). Examples of amorphization methods include a mechanical milling method and a melt extraction method, but a mechanical milling method is preferably used since processing can be performed at room temperature, enabling simplification of the manufacturing process.

The aforementioned mechanical milling method may be performed using, for example, a ball mill, a turbo mill, a mechanofusion device, or a disc mill. When the mechanical milling method is performed using a ball mill, a rotation speed may be set between 50 rpm and 500 rpm, for example, but is preferably set between 100 rpm and 300 rpm.

Further, since $Li_2S$ is highly reactive, similarly to bridging sulfur, the sulfide solid state electrolyte material according to this embodiment may be substantially free of $Li_2S$. The phrase "the sulfide solid state electrolyte material is substantially free of $Li_2S$" means that the sulfide solid state electrolyte material is substantially free of $Li_2S$ derived from the raw material composition used to manufacture the sulfide solid state electrolyte material. The fact that "the sulfide solid state electrolyte material is substantially free of $Li_2S$" may be confirmed by measuring the sulfide solid state electrolyte material using an X ray diffraction analysis method. More specifically, when a result of an X ray diffraction analysis method performed on the sulfide solid state electrolyte material indicates that a $Li_2S$ peak ($2\theta=27.0°, 31.2°, 44.8°, 53.1°$) is absent, it may be determined that the sulfide solid state electrolyte material is substantially free of $Li_2S$. Note that when the proportion of $Li_2S$ in the raw material composition is too large, the sulfide solid state electrolyte material is more likely to contain $Li_2S$, and conversely, when the proportion of $Li_2S$ in the raw material composition is too small, the manufactured sulfide solid state electrolyte material is more likely to contain the aforementioned bridging sulfur.

When the sulfide solid state electrolyte material according to this embodiment is substantially free of bridging sulfur and $Li_2S$, the sulfide solid state electrolyte material typically has an ortho-composition or a composition close to an ortho-composition. An ortho-composition is typically a composition having a maximum degree of hydration from among oxyacids obtained by hydrating an identical oxide. In this embodiment, an ortho-composition denotes a crystalline composition to which a larger amount of $Li_2S$ is attached than in other sulfides. For example, $Li_3PS_4$ corresponds to an ortho-composition in a $Li_2S$—$P_2S_5$ material, and the ratio of $Li_2S$ to $P_2S_5$ for obtaining an ortho-composition is $Li_2S:P_2S_5=75:25$ in terms of molar conversion.

The ratio of $Li_2S$ to $P_2S_5$ in the raw material composition in terms of molar conversion may be $Li_2S:P_2S_5=72$ to $78:22$ to $28$, but is preferably $Li_2S:P_2S_5 73$ to $77:23$ to $27$ and more preferably $Li_2S P_2S_5=74$ to $76:24$ to $26$. In other words, a ratio of $P_2S_5$ to $Li_2S$ may be no less than $11/39$ and no more than $14/36$, but is preferably no less than $23/77$ and no more than $27/73$, and more preferably no less than $6/19$ and no more than $13/37$. By setting the composition of the two substances in a range including the ratio ($Li_2S:P_2S_5=75:25$) for obtaining an ortho-composition and the vicinity thereof, reactivity with the hydrophobic polymer can be reduced even further.

When $Li_2S$ is used in the raw material composition, an amount of intermixed impurities is preferably as small as possible. As a result, secondary reactions can be suppressed. A method described in Japanese Patent Application Publication No. 7-330312 (JP-A-7-330312), for example, may be used as a method of synthesizing the $Li_2S$. Further, the $Li_2S$ is preferably refined using a method described in WO 2005/040039 or the like.

In this embodiment, the raw material composition may contain only $Li_2S$ and $P_2S_5$ or may also contain another sulfide. The other sulfide may be aluminum sulfide ($Al_2S_3$), silicon sulfide ($SiS_2$), germanium disulfide ($GeS_2$), diphosphorus trisulfide ($P_2S_3$), diarsenic trisulfide ($As_2S_3$), or diantimony trisulfide ($Sb_2S_3$), for example. Moreover, the raw material composition may contain at least one type of lithium ortho-oxyacid salt selected from the group consisting of $Li_3PO_4$, $Li_4SiO_4$, $Li_4GeO_4$, $Li_3BO_3$ and $Li_3AlO_3$. By adding this type of lithium ortho-oxyacid salt, a more stable sulfide solid state electrolyte material can be obtained.

Further, the sulfide solid state electrolyte material according to this embodiment may be sulfide glass or crystallized sulfide glass. Sulfide glass is softer than crystallized sulfide glass and is therefore capable of absorbing expansion and contraction of the electrode active material, leading to an improvement in the cycle characteristic. On the other hand, crystallized sulfide glass exhibits higher Li ion conductivity than sulfide glass. Further, sulfide glass can be obtained by performing the aforementioned amorphization treatment on the raw material composition, for example, while crystallized sulfide glass can be obtained by subjecting sulfide glass to heat treatment at a temperature no lower than a crystallization temperature, for example. In other words, crystallized sulfide glass can be obtained by performing amorphization treatment and heat treatment successively on the raw material composition. Depending on the heat treatment conditions, bridging sulfur and $Li_2S$ may be generated and a stable phase may be generated. Therefore, in this embodiment, a heat treatment temperature and a heat treatment period may be adjusted so that these components are not generated. Further, the temperature during the heat treatment for synthesizing the crystallized sulfide glass may be set between 150° C. and 360° C., for example.

Furthermore, a Li ion conductivity value of the sulfide solid state electrolyte material according to this embodiment may be set high. The Li ion conductivity at room temperature may be set at no less than $10^{-5}$ S/cm, for example, but is preferably set at no less than $10^{-4}$ S/cm. The sulfide solid state electrolyte material according to this embodiment may take a particulate shape, a spherical shape, or an oval sphere shape, for example. When the sulfide solid state electrolyte material takes a particulate shape, an average particle diameter thereof may be set between 0.1 μm and 50 μm, for example.

The sulfide solid state electrolyte material content of the electrode active material layer may be large. More specifically, the content may be set at no less than 50% by weight, but is preferably no less than 70% by weight, more preferably no less than 90% by weight, and even more preferably no less than 95% by weight.

Next, the hydrophobic polymer according to this embodiment will be described. The hydrophobic polymer according to this embodiment binds the sulfide solid state electrolyte material described above. A hydrophobic polymer typically functions as a binding material. Further, the hydrophobic polymer according to this embodiment may be free of a hydrophilic group. The fact that the hydrophobic polymer is free of a hydrophilic group may be confirmed by confirming that a peak of the hydrophilic group does not appear when the hydrophobic polymer is measured using an infrared spectroscopy (IR), for example. A hydroxyl group, a ketone group, a carbonyl group, and so on may be cited as examples of the hydrophilic group.

An elastomer exhibits a superior binding property and may therefore be used as the hydrophobic polymer according to this embodiment. Further, the elastomer may be a thermoplastic elastomer or a thermosetting elastomer but is preferably rubber. The rubber may be vulcanized or non-vulcanized.

Furthermore, a hydrocarbon-based polymer exhibits a superior hydrophobic property and may therefore be used as the hydrophobic polymer according to this embodiment. The hydrocarbon-based polymer may be constituted by carbon and hydrogen, but the hydrogen bonded to the carbon may be replaced partially or wholly by a halogen such as fluorine.

In this embodiment, the hydrocarbon-based polymer may be a diene-based elastomer having a double bond in the main chain or a non-diene-based elastomer not having a double bond in the main chain. The diene-based elastomer may be, for example, a polymer/copolymer rubber such as styrene-butadiene rubber (SBR), styrene-ethylene-butadiene rubber (SEBR), butyl rubber (IIR), butadiene rubber (BR), or isoprene rubber (IR) or ethylene-propylene-diene rubber, but is preferably SBR or SEBR. Thus, a further improvement in a binding force can be achieved.

Meanwhile, the non-diene-based elastomer may be an olefin-based elastomer such as ethylene-propylene rubber or styrene-ethylene-butylene rubber, or a fluorine-based elastomer such as vinylidene fluoride rubber or tetrafluoroethylene-propylene rubber.

A number average molecular weight of the hydrophobic polymer may be between 1,000 and 700,000, for example, but is preferably between 10,000 and 100,000 and more preferably between 30,000 and 80,000. When the molecular weight of the hydrophobic polymer is too small, it may be impossible to obtain the desired flexibility, and when the molecular weight of the hydrophobic polymer is too large, solubility relative to a solvent may decrease, making it difficult to obtain a desired dispersion condition.

The hydrophobic polymer content of the solid state electrolyte layer differs depending on the type of the hydrophobic polymer, but may be between 0.01% and 30% by weight, for example, and is preferably between 0.1% and 10% by weight. When the hydrophobic polymer content is too small, it may be impossible to obtain the desired flexibility, and when the hydrophobic polymer content is too large, a reduction in Li ion conductivity may occur.

The solid state electrolyte layer according to this embodiment may contain a surfactant and a reaction accelerator, as will be described below. Further, to achieve favorable workability and moldability, the solid state electrolyte layer according to this embodiment may possess a desired degree of flexibility. The solid state electrolyte layer may take a sheet form or a pellet form, for example. A thickness of the solid state electrolyte layer may be between 0.1 µm and 1000 µm, for example, but is preferably between 0.1 µm and 300 µm.

Next, the electrode active material layer according to this embodiment will be described. The electrode active material layer according to this embodiment contains an electrode active material, a sulfide solid state electrolyte material that is manufactured from a raw material composition containing $Li_2S$ and $P_2S_5$ and is substantially free of bridging sulfur; and a hydrophobic polymer for binding the electrode active material and the sulfide solid state electrolyte material.

According to this embodiment, by using a sulfide solid state electrolyte material that is substantially free of bridging sulfur and a hydrophobic polymer, an electrode active material layer in which an increase in resistance caused by deterioration of the sulfide solid state electrolyte material is suppressed can be obtained. Note that the advantages of the sulfide solid state electrolyte material and the hydrophobic polymer according to this embodiment are as described above in the first embodiment. Further, when the sulfide solid state electrolyte material contains bridging sulfur, the electrode active material included in the electrode active material layer reacts with the sulfide solid state electrolyte material such that a high-resistance layer is generated. In this embodiment, on the other hand, a sulfide solid state electrolyte material substantially free of bridging sulfur is used, and therefore generation of a high-resistance layer can be suppressed. As a result, an electrode active material layer having reduced resistance can be obtained.

Figure 2:
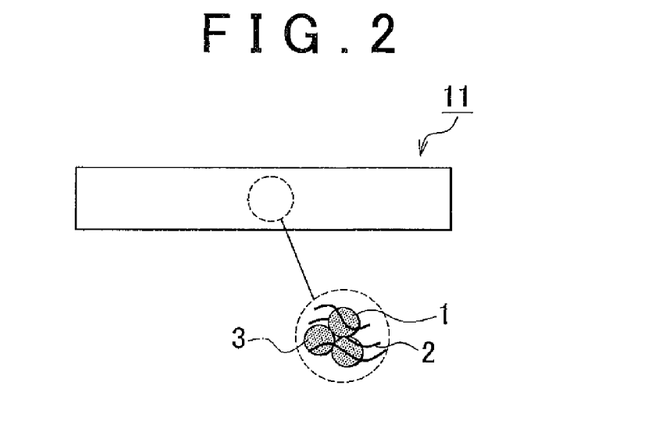
FIG. 2 is a schematic sectional view showing an electrode active material layer according to a second embodiment of the invention.

FIG. 2 is a schematic sectional view showing an example of the electrode active material layer according to this embodiment. An electrode active material layer 11 shown in FIG. 2 contains an electrode active material 3, a sulfide solid state electrolyte material 1 that is manufactured from a raw material composition containing $Li_2S$ and $P_2S_5$ and is substantially free of bridging sulfur; and a hydrophobic polymer 2 for binding the electrode active material 3 and the sulfide solid state electrolyte material 1.

The electrode active material layer according to this embodiment contains the electrode active material, the sulfide solid state electrolyte material, and the hydrophobic polymer. Note that the sulfide solid state electrolyte material and the hydrophobic polymer are identical to those described above in the first embodiment.

The electrode active material according to this embodiment may be a negative electrode active material or a positive electrode active material, but is preferably an oxide positive electrode active material. An oxide positive electrode active material reacts with a sulfide solid state electrolyte material containing bridging sulfur such that a high-resistance layer is generated more easily, and therefore, by using an oxide positive electrode active material in this embodiment, a greater effect is achieved. In this embodiment, a sulfide solid state electrolyte material that is substantially free of bridging sulfur is used, and therefore generation of a high-resistance layer can be suppressed. Moreover, by using an oxide positive electrode active material, an electrode active material layer exhibiting high energy density can be obtained. A positive electrode active material expressed by a general formula $Li_xM_yO_z$ (where M is a transition metal element, x=0.02 to 2.2, y=1 to 2, and z=1.4 to 4) may be cited as an example of the oxide positive electrode active material. In this general formula, M may be at least one element selected from the group consisting of (Co), (Mn), (Ni), vanadium (V), iron (Fe) Lind silicon (Si), but is preferably at least one element selected from the group consisting of Co, Ni and Mn. More specifically, the oxide positive electrode active material may be a compound expressed by a general formula $LiCoO_2$, $LiMnO_2$, $LiNiO_2$, $LiVO_2$, $LiNi_{1/3}CO_{1/3}Mn_{1/3}O_2$, $LiMn_2O_4$, $Li(Ni_{0.5}Mn_{1.5})O_4$, $Li_2FeSiO_4$, or $Li_2MnSiO_4$. The positive electrode active material may also be an olivine positive electrode active material expressed by a general formula such as $LiFePO_4$ or $LiMnPO_4$.

The positive electrode active material may take a particulate shape, for example, but preferably takes a spherical shape or an oval sphere shape. When the positive electrode active material takes a particulate shape, an average particle diameter thereof may be set between 0.1 µm and 50 µm, for example. Further, the positive electrode active material content of the electrode active material layer (positive electrode active material layer) may be set between 10% and 99% by weight, for example, but is preferably between 20% and 90% by weight.

A negative electrode active material according to this embodiment, on the other hand, may be a metal active material or a carbon active material, for example. Examples of metal active materials include indium (In), aluminum (Al), Si, and tin (Sn). Meanwhile, mesocarbon microbeads (MCMB), highly oriented pyrolytic graphite (HOPG), hard carbon, or soft carbon, for example, may be used as the carbon active material.

The negative electrode active material may take a particulate shape, for example, but preferably takes a spherical shape or an oval sphere shape. When the negative electrode active material takes a particulate shape, an average particle diameter thereof may be set within a range of 0.1 µm to 50 µm, for example. Further, the negative electrode active material content of the electrode active material layer (negative electrode active material layer) may be set between 10% and 99% by weight, for example, but is preferably between 20% and 90% by weight.

The sulfide solid state electrolyte material content of the electrode active material layer may be set between 1% and 90% by weight, for example, but is preferably between 10% and 50% by weight. When the sulfide solid state electrolyte material is too small, the Li ion conductivity of the electrode active material layer may decrease, and when the sulfide solid state electrolyte material content is too large, a reduction in capacity may occur.

The hydrophobic polymer content of the electrode active material layer may be set between 0.01% and 30% by weight, for example, but is preferably between 0.1% and 10% by weight. When the hydrophobic polymer content is too small, it may be impossible to obtain the desired flexibility, and when the hydrophobic polymer content is too large, reductions in Li ion conductivity and electron conductivity may occur.

The electrode active material layer according to this embodiment contains at least the electrode active material, sulfide solid state electrolyte material and hydrophobic polymer described above. The electrode active material layer according to this embodiment may also include a conductive material. By adding a conductive material, the conductivity of the electrode active material layer can be improved. The conductive material may be acetylene black, Ketjen black, or carbon fiber, for example. Further, the electrode active material layer according to this embodiment may have a desired degree of flexibility. With this constitution, the electrode active material layer exhibits superior workability and moldability. The electrode active material layer may take a sheet form or a pellet form, for example. A thickness of the electrode active material layer may be set between 1 µm and 200 µm, for example.

Next, an all solid state lithium battery according to a third embodiment of the invention will be described. The all solid state lithium battery according to this embodiment includes a positive electrode active material layer, a negative electrode active material layer, and a solid state electrolyte layer formed between the positive electrode active material layer and the negative electrode active material layer. Further, the all solid state lithium battery according to this embodiment can be broadly divided into two aspects.

In a first aspect of the all solid state lithium battery according to this embodiment, the solid state electrolyte layer is the solid state electrolyte layer according to the first embodiment described above. In this case, by employing the solid state olyte layer described above, an all solid state lithium battery having low battery resistance is obtained. In particular, a greater amount of sulfide solid state electrolyte material is used in the solid state electrolyte layer than in the electrode active material layer, and therefore the effects of the first embodiment can be exhibited sufficiently.

Figure 3:
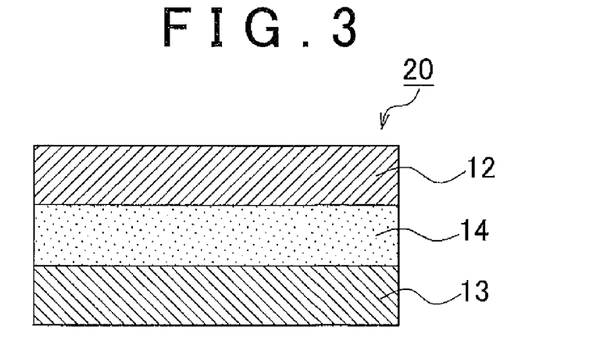
FIG. 3 is a schematic sectional view showing a power generation element of an all solid state lithium battery according to a third embodiment of the invention.

FIG. 3 is a schematic sectional view showing an example of a power generation element of the all solid state lithium battery according to this embodiment. A power generation element 20 shown in FIG. 3 includes a positive electrode active material layer 12, a negative electrode active material layer 13, and a solid state electrolyte layer 14 formed between the positive electrode active material layer 12 and the negative electrode active material layer 13. In the first aspect, the solid state electrolyte layer 14 is the solid state electrolyte layer described above.

The all solid state lithium battery according to the first aspect includes at least a power generation element constituted by a positive electrode active material layer, a negative electrode active material layer, and a solid state electrolyte layer formed between the positive electrode active material layer and the negative electrode active material layer. Further, the all solid state lithium battery typically includes a positive electrode collector for performing current collection on the positive electrode active material layer and a negative electrode collector for performing current collection on the negative electrode active material layer. Stainless used steel (SUS), aluminum, nickel, iron, titanium, carbon, and so on, for example, may be used as a material of the positive electrode collector, but SUS is preferable. Meanwhile, the material of the negative electrode collector may be SUS, copper, nickel, or carbon, for example, but SUS is preferable. Further, the thickness, shape, and so on of the positive electrode collector and negative electrode collector may be selected appropriately in accordance with the application and so on of the all solid state lithium battery. Furthermore, a typical battery case for an all solid state lithium battery may be used as a battery case. The battery case may be made of SUS, for example. The battery case may be coin-shaped, laminated, cylindrical, or angular. Note that the power generation element may be formed in the interior of an insulation ring.

The all solid state lithium battery according to the first aspect may be a primary battery or a secondary battery. When the all solid state lithium battery is a secondary battery, an increase in battery resistance due to repeated charging and discharging can be suppressed, and the battery can be used as a vehicle-installed battery, for example. As long as the all solid state lithium battery described above can be obtained, there are no particular limitations on the method of manufacturing the all solid state lithium battery, and a similar method to a typical manufacturing method for an all solid state lithium battery may be employed.

In the second aspect of the all solid state lithium battery according to this embodiment, at least one of the positive electrode active material layer and the negative electrode active material layer is the electrode active material layer according to the second embodiment described above. In this case, by using the electrode active material layer described above, generation of a high-resistance layer caused by a reaction between the electrode active material and the sulfide solid state electrolyte contained in the electrode active material layer can be suppressed, and therefore an all solid state lithium battery having low battery resistance can be obtained.

In the second aspect, as shown in FIG. 3, at least one of the positive electrode active material layer 12 and the negative electrode active material layer 13 may be the electrode active material layer described above, but in order to suppress an increase in battery resistance even further, both of the positive electrode active material layer 12 and the negative electrode active material layer 13 may be the electrode active material layer described above. Further, in the second aspect, the solid state electrolyte layer may be the solid state electrolyte layer according to the first embodiment described above. In so doing, an increase in battery resistance can be suppressed even further. Note that apart from the power generation element, the constitution of the all solid state lithium battery is identical to that of the first aspect described above.

Next, a manufacturing method for a solid state electrolyte layer according to a fourth embodiment of the invention will be described. The manufacturing method for a solid state electrolyte layer according to this embodiment includes a mixing step for mixing a sulfide solid state electrolyte material that is manufactured from a raw material composition containing $Li_2S$ and $P_2S_5$ and is substantially free of bridging sulfur with a hydrophobic polymer in a solvent to prepare a solid state electrolyte layer forming slurry, and a coating step for coating a substrate with the solid state electrolyte layer forming slurry to form a solid state electrolyte layer forming coated film.

According to this embodiment, by using the sulfide solid state electrolyte material substantially free of bridging sulfur and the hydrophobic polymer, a solid state electrolyte layer in which an increase in resistance due to deterioration of the sulfide solid state electrolyte material is suppressed can be obtained. Each step of the manufacturing method for a solid state electrolyte layer according to this embodiment will be described below.

In the mixing step according to this embodiment, the sulfide solid state electrolyte material manufactured from a raw material composition containing $Li_2S$ and $P_2S_5$ and substantially free of bridging sulfur is mixed with the hydrophobic polymer in a solvent to prepare the solid state electrolyte layer forming slurry. Note that the sulfide solid state electrolyte material and the hydrophobic polymer are identical to those described above in the first embodiment.

There are no particular limitations on the solvent of the solid state electrolyte layer forming slurry as long as the sulfide solid state electrolyte material and the hydrophobic polymer can be dispersed through the solvent. More specifically, the solvent may be a saturated hydrocarbon-based solvent, an aromatic hydrocarbon-based solvent, a fluorine-based solvent, or a chlorine-based solvent, but is preferably a saturated hydrocarbon-based solvent, an aromatic hydrocarbon-based solvent, or a fluorine-based solvent. Further, the solvent may contain a surfactant. The surfactant may be a polyether-based surfactant and a polythiol-based surfactant, for example. Furthermore, the solid state electrolyte layer forming slurry may be obtained by stirring the constitutional materials thereof for a predetermined time.

In the coating step according to this embodiment, the substrate is coated with the solid state electrolyte layer forming slurry to form the solid state electrolyte layer forming coated film. The substrate may be constituted by a peelable substrate such as a fluorine resin sheet and the electrode active material layer, for example. Note that in a manufacturing method for an electrode active material layer to be described below, a collector may be used as the substrate. Further, there are no particular limitations on the method of applying the solid state electrolyte layer forming slurry, and a doctor blade method, a die coating method, or a gravure coating method, for example, may be employed.

In addition to the steps described above, the manufacturing method for a solid state electrolyte layer according to this embodiment may include a compression step. Thus, a high-density solid state electrolyte layer can be obtained, and as a result, an improvement in Li ion conductivity and an increase in capacity due to a reduction in the film thickness of the solid state electrolyte layer can be achieved.

Next, a manufacturing method for an electrode active material layer according to a fifth embodiment of the invention will be described. The manufacturing method for an electrode active material layer according to this embodiment includes a mixing step for mixing together an electrode active material, a sulfide solid state electrolyte material that is manufactured from a raw material composition containing $Li_2S$ and $P_2S_5$ and is substantially free of bridging sulfur, and a hydrophobic polymer in a solvent to form an electrode active material layer forming slurry, and a coating step for coating a substrate with the electrode active material layer forming slurry to form an electrode active material layer forming coated film.

According to this embodiment, by using the sulfide solid state electrolyte material substantially free of bridging sulfur and the hydrophobic polymer, an electrode active material layer in which an increase in resistance due to deterioration of the sulfide solid state electrolyte material is suppressed can be obtained.

In the mixing step according to this embodiment, the electrode active material, the sulfide solid state electrolyte material manufactured from a raw material composition containing $Li_2S$ and $P_2S_5$ and substantially free of bridging sulfur, and the hydrophobic polymer are mixed together in a solvent to form the electrode active material layer forming slurry. The electrode active material, sulfide solid state electrolyte material, and hydrophobic polymer are identical to those described above in the second embodiment. Further, remaining items are identical to those described above in the fourth embodiment.

The invention will be described more specifically below using examples. Note that unless indicated otherwise, each operation was implemented in an argon gas-filled glove box or in an argon gas atmosphere.

FIRST EXAMPLE

Lithium sulfide ($Li_2S$) and diphosphorus pentasulfide ($P_2S_5$) were used as starting materials. Powders thereof were weighed using a composition of $xLi_2S \cdot (100-x) P_2S_5$ to obtain a molar ratio of x=75, whereupon the powders were mixed using an agate pestle to obtain a raw material composition. Next, 1 g of the obtained raw material composition was introduced into a 45 ml zirconia pot together with ten zirconia balls (Φ10 mm), whereupon the pot was tightly and completely sealed. The pot was then attached to a planetary ball mill device, whereupon mechanical milling was performed for 20 hours at a rotation speed of 300 rpm to obtain a sulfide solid state electrolyte material (sulfide glass, 75 $Li_2S$-25 $P_2S_5$). Note that the relationship of $Li_2S:P_2S_5$=75:25 (molar ratio) is a relationship for obtaining the aforesaid ortho-composition, and therefore the obtained sulfide solid state electrolyte material was free of bridging sulfide.

First, $LiCoO_2$ (1040 mg) serving as the positive electrode active material, 75 $Li_2S$-25 $P_2S_5$ (445 mg) serving as the sulfide solid state electrolyte, and styrene-butadiene rubber (SBR, styrene ratio: 25%; molecular weight: 30,000 to 50,000; 15 mg) serving as the hydrophobic polymer were prepared, whereupon these materials were dispersed in dehydrated heptane (660 mg) to obtain a positive electrode active material layer forming slurry. A solid composition of the positive electrode active material layer forming slurry was 69.3% by weight of $LiCoO_2$, 29.7% by weight of 75 $Li_2S$-25 $P_2S_5$, and 1% by weight of SBR. Next, SUS foil serving as a positive electrode collector was coated with the slurry in a coating amount of 16.1 mg/cm$^2$, whereupon heat treatment was implemented for 60 minutes at 120° C. Finally, the obtained film was cut into a cell size (1 cm$^2$), whereby the positive electrode active material layer was obtained.

As a solid state electrolyte layer forming material, 75 Li$_2$S-25 P$_2$S$_5$ (65 mg) was prepared, and as a negative electrode active material layer forming composite material, a mixture of graphite (6.0 mg) and 75 Li$_2$S-25 P$_2$S$_5$ (6.0 mg) was prepared. The solid state electrolyte layer forming material was then pressed at a pressure of 1 ton/cm$^2$ to form the solid state electrolyte layer. Next, the positive electrode active material layer described above was disposed on one surface of the solid state electrolyte layer, whereupon 1 ton/cm$^2$ of pressure was applied. Next, the negative electrode active material layer forming composite material was applied to the other surface of the solid state electrolyte layer, whereupon 4.3 ton/cm$^2$ of pressure was applied. Finally, SUS foil was disposed on the negative electrode active material layer of the power generation element, whereby an evaluation battery was obtained.

FIRST COMPARATIVE EXAMPLE

Lithium sulfide (Li$_2$S) and diphosphorus pentasulfide (P$_2$S$_5$) were used as starting materials. Powders thereof were weighed using a composition of xLi$_2$S·(100−x)P$_2$S$_5$ to obtain a molar ratio of x=70, whereupon the powders were mixed using an agate pestle to obtain a raw material composition. Next, 1 g of the obtained raw material composition was introduced into a 45 ml zirconia pot together with ten zirconia balls (Φ10 mm), whereupon the pot was tightly and completely sealed. The pot was then attached to a planetary ball mill device, whereupon mechanical milling was performed for 20 hours at a rotation speed of 300 rpm. The powder obtained as a result was then subjected to heat treatment under conditions of 290° C. and 2 hours, whereby a sulfide solid state electrolyte material (crystallized sulfide glass, Li$_7$P$_3$S$_{11}$) was obtained. Note that Li$_7$P$_3$S$_{11}$ contains bridging sulfide (an S$_3$P—S—PS$_3$ unit).

Apart from the use of Li$_7$P$_3$S$_{11}$ in the positive electrode active material layer, solid state electrolyte layer, and negative electrode active material layer instead of 75 Li$_2$S-25 P$_2$S$_5$, an evaluation battery was obtained in an identical manner to the first example.

SECOND EXAMPLE

An evaluation battery was obtained in an identical manner to the first example except that styrene-ethylene-butadiene (SEBR, styrene ratio: 20%; molecular weight: 30,000 to 50,000) was used instead of styrene-butadiene rubber.

SECOND COMPARATIVE EXAMPLE

An evaluation battery was obtained in an identical manner to the second example except that Li$_7$P$_3$S$_{11}$ was used in the positive electrode active material layer, solid state electrolyte layer, and negative electrode active material layer instead of 75 Li$_2$S-25 P$_2$S$_5$.

THIRD COMPARATIVE EXAMPLE

LiCoO$_2$ (998 mg) serving as the positive electrode active material, 75 Li$_2$S-25 P$_2$S$_5$ (428 mg) serving as the sulfide solid state electrolyte, and silicone rubber containing a hydroxyl group (a silicone rubber manufactured by Dow Corning Toray, molecular weight: 50,000 to 80,000; 75 mg) serving as a polymer were prepared, whereupon these materials were dispersed in dehydrated heptane (660 mg) to obtain a positive electrode active material layer forming slurry. A solid composition of the positive electrode active material layer forming slurry was 66.5% by weight of LiCoO$_2$, 28.5% by weight of 75 Li$_2$S-25 P$_2$S$_5$, and 5% by weight of silicone rubber. Apart from the use of this slurry, an evaluation battery was obtained in an identical manner to the first example.

FOURTH COMPARATIVE EXAMPLE

An evaluation battery was obtained in an identical manner to the third comparative example except that Li$_7$P$_3$S$_{11}$ was used in the positive electrode active material layer, solid state electrolyte layer, and negative electrode active material layer instead of 75 Li$_2$S-25 P$_2$S$_5$.

EVALUATION

A battery resistance increase rate was measured using the evaluation batteries obtained in the first and second examples and the first to fourth comparative examples. First, a cycle test (30 cycles) was performed on the evaluation batteries from SOC 0% to 100%, whereupon the evaluation batteries were charged to SOC 80% and resistance was measured by measuring alternating current impedance. The battery resistance increase rate was calculated by dividing the obtained resistance value by a resistance value obtained at the time of an initial charge. Note that the conditions for measuring the alternating current impedance were set at voltage amplitude: 10 mV, measurement frequency: 1 MHz to 0.1 Hz, and 25° C.

Figure 4:
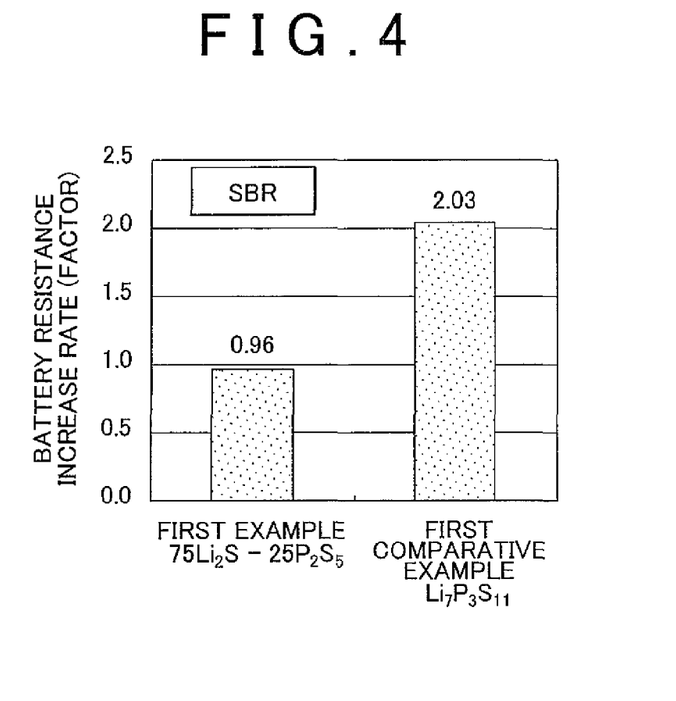
FIG. 4 shows results relating to a battery resistance increase rate in a first example and a first comparative example.
Figure 5:
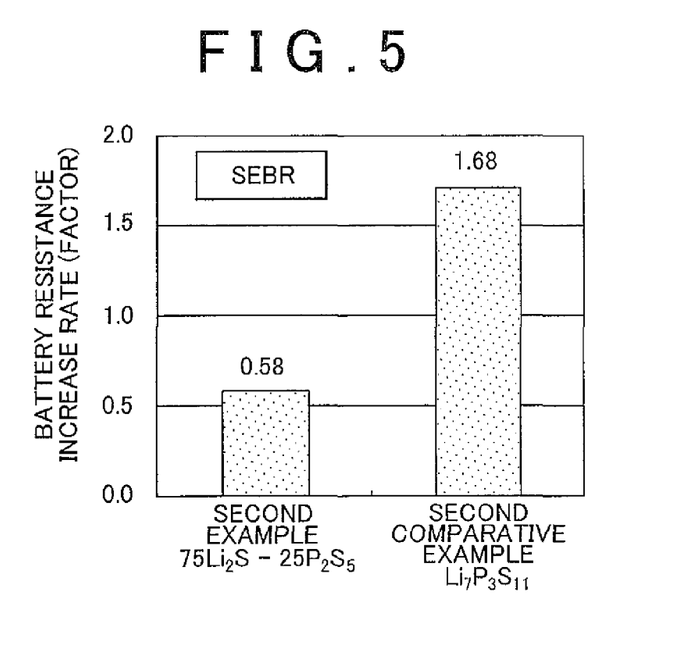
FIG. 5 shows results relating to the battery resistance increase rate in a second example and a second comparative example.
Figure 6:
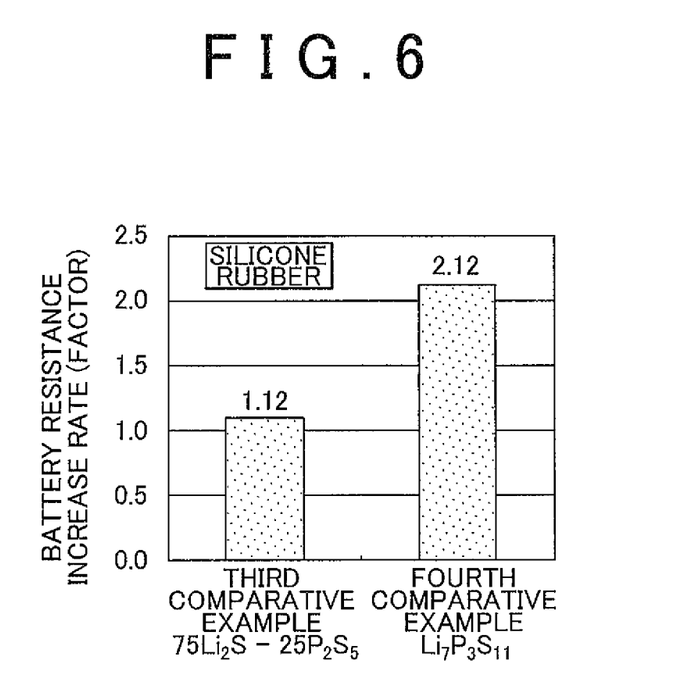
FIG. 6 shows results relating to the battery resistance increase rate in a third comparative example and a fourth comparative example.

Results are shown in FIGS. 4 to 6. As shown in FIG. 4, it was possible to suppress an increase in battery resistance to a greater degree in the first example than in the first comparative example. Similarly, as shown in FIG. 5, it was possible to suppress an increase in battery resistance to a greater degree in the second example than in the second comparative example. A reason for these results is that when a sulfide solid state electrolyte material free of an S$_3$P—S—PS$_3$ unit is used, a reaction with the polymer is suppressed, and therefore deterioration of the sulfide solid state electrolyte material can be suppressed.

Further, in the first and second examples, the battery resistance increase rate was smaller than 1. A reason for this is as follows. When the evaluation battery is charged and discharged, a volume of the positive electrode active material varies, and as a result, a joint between the positive electrode active material and the sulfide solid state electrolyte material becomes more likely to break, leading to an increase in resistance. However, when a hydrophobic polymer serving as an elastic body is used, the joint becomes less likely to break, and therefore the battery resistance increase rate can be held below 1. Furthermore, in the second example, the battery resistance increase rate was even smaller than that of the first example. A reason for this is that the SEBR used in the second example has a superior dispersion property in a solvent than the SBR used in the first example, and therefore a favorable interface can be formed on the positive electrode active material layer.

As shown in FIG. 6, on the other hand, although it was possible to suppress an increase in the battery resistance of the third comparative example in comparison with the fourth comparative example, a slight increase in resistance was confirmed. A reason for this is that a slight amount of the hydroxyl group is caused to remain in the silicone rubber to contribute to the binding property, but since the hydroxyl group reacts with the sulfur component (the sulfur component other than bridging sulfur) of the sulfide solid state electrolyte material, the sulfide solid state electrolyte material deteriorates. Hence, it was confirmed that in order to suppress the battery resistance increase rate below 1, a hydrophobic polymer that is free of a hydrophilic group such as a hydroxyl group is preferably used.

An outline of an embodiment of the invention will be described below.

An embodiment of the invention relates to a solid state electrolyte layer including: a sulfide solid state electrolyte material that is manufactured from a raw material composition containing $Li_2S$ and $P_2S_5$ and is substantially free of bridging sulfur; and a hydrophobic polymer for a binding the sulfide solid state electrolyte material. According to this constitution, by using the sulfide solid state electrolyte material substantially free of bridging sulfur and the hydrophobic polymer, a solid state electrolyte layer in which an increase in resistance due to deterioration of the sulfide solid state electrolyte material is suppressed can be obtained.

In the solid state electrolyte layer described above, the hydrophobic polymer may be a hydrocarbon-based polymer. According to this constitution, an improvement in a hydrophobic property of the hydrophobic polymer is achieved.

In the solid state electrolyte layer described above, the hydrocarbon-based polymer may be a styrene-butadiene rubber (SBR) or a styrene-ethylene-butadiene rubber (SEBR). According to this constitution, a further improvement in binding force can be achieved.

In the solid state electrolyte layer described above, a ratio of a mole number of the $P_2S_5$ to a mole number of the $Li_2S$ in the raw material composition may be no smaller than 11/39 and no larger than 14/36. According to this constitution, a sulfide solid state electrolyte material containing even less bridging sulfur can be obtained.

In the solid state electrolyte layer described above, the sulfide solid state electrolyte material may be a sulfide glass. According to this constitution, sulfide glass is softer than crystallized sulfide glass, and therefore expansion and contraction of the electrode active material can be absorbed, enabling an improvement in a cycle characteristic.

In the solid state electrolyte layer described above, the sulfide solid state electrolyte material may be a crystallized sulfide glass. According to this constitution, a sulfide solid state electrolyte material exhibiting more favorable Li ion conductivity than sulfide glass can be obtained.

Further, an embodiment of the invention relates to an electrode active material layer including: an electrode active material; a sulfide solid state electrolyte material that is manufactured from a raw material composition containing $Li_2S$ and $P_2S_5$ and is substantially free of a bridging sulfur; and a hydrophobic polymer for binding the electrode active material and the sulfide solid state electrolyte material. According to this constitution, by using the sulfide solid state electrolyte material substantially free of bridging sulfur and the hydrophobic polymer, an electrode active material layer in which an increase in resistance due to deterioration of the sulfide solid state electrolyte material is suppressed can be obtained.

In the electrode active material layer described above, the hydrophobic polymer may be a hydrocarbon-based polymer. According to this constitution, an improvement in a hydrophobic property of the hydrophobic polymer is achieved.

In the invention described above, the hydrocarbon-based polymer may be a styrene-butadiene rubber (SBR) or a styrene-ethylene-butadiene rubber (SEBR).

According to this constitution, a further improvement in binding force can be achieved.

In the electrode active material layer described above, a ratio of a mole number of the $P_2S_5$ to a mole number of the $Li_2S$ in the raw material composition may be no smaller than 11/39 and no larger than 14/36. According to this constitution, a sulfide solid state electrolyte material containing even less bridging sulfur can be obtained.

In the electrode active material layer described above, the sulfide solid state electrolyte material may be a sulfide glass. According to this constitution, sulfide glass is softer than crystallized sulfide glass, and therefore expansion and contraction of the electrode active material can be absorbed, enabling an improvement in a cycle characteristic.

In the electrode active material layer described above, the sulfide solid state electrolyte material may be a crystallized sulfide glass. According to this constitution, a sulfide solid state electrolyte material exhibiting more favorable Li ion conductivity than sulfide glass can be obtained.

Further, an embodiment of the invention relates to an all solid state lithium battery including: a positive electrode active material layer; a negative electrode active material layer; and the solid state electrolyte layer described above, which is formed between the positive electrode active material layer and the negative electrode active material layer. According to this constitution, by using the solid state electrolyte layer described above, an all solid state lithium battery having low battery resistance can be obtained. In particular, the solid state electrolyte layer uses more of the sulfide solid state electrolyte material than the electrode active material layer, and therefore the effects of this embodiment of the invention can be exhibited sufficiently.

Further, an embodiment of the invention relates to an all solid state lithium battery including: a positive electrode active material layer; a negative electrode active material layer; and a solid state electrolyte layer formed between the positive electrode active material layer and the negative electrode active material layer. At least one of the positive electrode active material layer and the negative electrode active material layer is the electrode active material layer described above. According to this constitution, by using the electrode active material layer described above, an all solid state lithium battery having low battery resistance can be obtained. In particular, generation of a high-resistance layer caused by a reaction between the electrode active material contained in the electrode active material layer and the sulfide solid state electrolyte can be suppressed, and therefore an all solid state lithium battery having low battery resistance can be obtained.

Further, an embodiment of the invention relates to a method for manufacturing a solid state electrolyte layer, including: mixing a sulfide solid state electrolyte material that is manufactured from a raw material composition containing $Li_2S$ and $P_2S_5$ and is substantially free of a bridging sulfur with a hydrophobic polymer in a solvent to prepare a solid state electrolyte layer forming slurry; and coating a substrate with the solid state electrolyte layer forming slurry to form a solid state electrolyte layer forming coated film. According to this constitution, by using the sulfide solid state electrolyte material that is substantially free of bridging sulfur and the hydrophobic polymer, a solid state electrolyte layer in which an increase in resistance due to deterioration of the sulfide solid state electrolyte material is suppressed can be obtained.

Further, an embodiment of the invention relates to a method for manufacturing an electrode active material layer, including: mixing together an electrode active material, a sulfide solid state electrolyte material that is manufactured from a raw material composition containing $Li_2S$ and $P_2S_5$ and is substantially free of bridging sulfur, and a hydrophobic polymer in a solvent to form an electrode active material layer forming slurry; and coating a substrate with the electrode active material layer forming slurry to form an electrode active material layer forming coated film. According to this constitution, by using the sulfide solid state electrolyte material that is substantially free of bridging sulfur and the hydrophobic polymer, an electrode active material layer in which an increase in resistance due to deterioration of the sulfide solid state electrolyte material is suppressed can be obtained.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A solid state electrolyte layer comprising:
  a sulfide solid state electrolyte material that is manufactured from a raw material composition containing $Li_2S$ and $P_2S_5$ and includes no more than 10 mol % of a bridging sulfur of an $S_3P$—S—$PS_3$ unit; and
  a hydrophobic polymer for binding the sulfide solid state electrolyte material.

2. The solid state electrolyte layer according to claim 1, wherein the hydrophobic polymer is a hydrocarbon-based polymer.

3. The solid state electrolyte layer according to claim 2, wherein the hydrocarbon-based polymer is a styrene-butadiene rubber or a styrene-ethylene-butadiene rubber.

4. The solid state electrolyte layer according to claim 1, wherein a ratio of a mole number of the $P_2S_5$ to a mole number of the $Li_2S$ in the raw material composition is no smaller than 11/39 and no larger than 14/36.

5. The solid state electrolyte layer according to claim 1, wherein the sulfide solid state electrolyte material is a sulfide glass.

6. The solid state electrolyte layer according to claim 1, wherein the sulfide solid state electrolyte material is a crystallized sulfide glass.

7. An all solid state lithium battery comprising:
  a positive electrode active material layer;
  a negative electrode active material layer; and
  the solid state electrolyte layer according to claim 1, which is formed between the positive electrode active material layer and the negative electrode active material layer.

8. A method for manufacturing a solid state electrolyte layer, comprising:
  mixing a sulfide solid state electrolyte material that is manufactured by amorphizing a raw material composition containing $Li_2S$ and $P_2S_5$ and includes no more than 10 mol % of a bridging sulfur of an $S_3P$—S—$PS_3$ unit with a hydrophobic polymer in a solvent to prepare a solid state electrolyte layer forming slurry; and
  coating a substrate with the solid state electrolyte layer forming slurry to form a solid state electrolyte layer forming coated film,
  wherein a ratio of mole number of the $P_2S_5$ to a mole number of the $Li_2S$ in the raw material composition is no smaller than 11/39 and no larger than 14/36, and
  mechanical milling is performed with a zirconia pot and zirconia balls to obtain the sulfide solid state electrolyte material.

9. The solid state electrolyte layer according to claim 1, wherein a ratio of a mole number of the $P_2S_5$ to a mole number of the $Li_2S$ in the raw material composition is from 75:25 to 78:22.

10. The solid state electrolyte layer according to claim 1, wherein the hydrophobic polymer is free of a hydrophilic group, and the hydrophobic polymer is at least one selected from the group consisting of styrene-ethylene-butadiene, butyl rubber, isoprene rubber, ethylene-propylene-diene rubber, olefin-based and non-diene-based elastomer, and fluorine-based and non-diene-based elastomer.

11. The solid state electrolyte layer according to claim 10, wherein
  a content of the hydrophobic polymer in the solid state electrolyte layer is from 0.01% to 30% by weight.

12. The solid state electrolyte layer according to claim 1, wherein
  the solid state electrolyte layer does not include unreacted $Li_2S$.

13. The solid state electrolyte layer according to claim 1, wherein
  a content of the sulfide solid state electrolyte material in the electrode active material layer is 90% by weight or more.

14. The solid state electrolyte layer according to claim 13, wherein
  the content of the sulfide solid state electrolyte material content in the electrode active material layer is 95% by weight or more.

15. The solid state electrolyte layer according to claim 1, wherein
  a number average molecular weight of the hydrophobic polymer is from 1,000 to 700,000.

16. The solid state electrolyte layer according to claim 15, wherein
  the number average molecular weight of the hydrophobic polymer is from 10,000 to 100,000.

17. The solid state electrolyte layer according to claim 16, wherein
  the number average molecular weight of the hydrophobic polymer is from 30,000 to 80,000.

18. The solid state electrolyte layer according to claim 1, wherein
  a content of the hydrophobic polymer in the solid state electrolyte layer is from 0.01% to 30% by weight.

19. The solid state electrolyte layer according to claim 18, wherein
  the content of the hydrophobic polymer in the solid state electrolyte layer is from 0.1% to 10% by weight.

20. The solid state electrolyte layer according to claim 1, wherein
  a thickness of the solid state electrolyte layer is from 0.1 μm to 1000 μm.

21. The solid state electrolyte layer according to claim 20, wherein
  the thickness of the solid state electrolyte layer is from 0.1 μm to 300 μm.

22. The method according to claim 8, wherein
  the hydrophobic polymer is free of a hydrophilic group, and the hydrophobic polymer is at least one selected from the group consisting of styrene-ethylene-butadiene, butyl rubber, isoprene rubber, ethylene-propylene-diene rubber, olefin-based and non-diene-based elastomer, and fluorine-based and non-diene-based elastomer.

23. The method according to claim 22, wherein
  a content of the hydrophobic polymer in the solid state electrolyte layer is from 0.01% to 30% by weight.

24. A solid state electrolyte layer comprising:
  a sulfide solid state electrolyte material that is manufactured from a raw material composition containing $Li_2S$ and $P_2S_5$ and includes no more than 10 mol % of a bridging sulfur of an $S_3P$—S—$PS_3$ unit; and a hydrophobic polymer for binding the sulfide solid state electrolyte material, wherein the hydrophobic polymer is free of a hydrophilic group, the hydrophobic polymer is at least one selected from the group consisting of styrene-ethylene-butadiene, butyl rubber, isoprene rubber, ethylene-propylene-diene rubber, olefin-based and non-diene-based elastomer, and fluorine-based and non-diene-based elastomer, and a content of the hydrophobic polymer in the solid state electrolyte layer is from 0.01% to 30% by weight.

* * * * *